United States Patent
Okada

(10) Patent No.: US 6,480,691 B2
(45) Date of Patent: Nov. 12, 2002

(54) DEVELOPING ROLL, DEVELOPING DEVICE USING THE SAME AND ELECTROPHOTOGRAPHIC APPARATUS

(75) Inventor: Hisao Okada, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/866,835

(22) Filed: May 30, 2001

(65) Prior Publication Data

US 2001/0048827 A1 Dec. 6, 2001

(30) Foreign Application Priority Data

Jun. 1, 2000 (JP) ........................................ 2000-164160

(51) Int. Cl.$^7$ .............................................. G03G 15/09

(52) U.S. Cl. ...................................................... 399/276

(58) Field of Search ................................. 399/276, 277, 399/267; 430/122; 492/28, 30, 36

(56) References Cited

U.S. PATENT DOCUMENTS 4,018,187 A * 4/1977 Abbott et al. ................ 399/276
4,308,821 A * 1/1982 Matsumoto et al. ..... 399/276 X
4,780,741 A * 10/1988 Wada et al. ............ 399/276 X

FOREIGN PATENT DOCUMENTS

JP 08-162321 * 6/1996

* cited by examiner

*Primary Examiner*—Sophia S. Chen
(74) *Attorney, Agent, or Firm*—Sughrue Mion, PLLC

(57) ABSTRACT

In a developing roll, grooves of a length direction of a developing roll are formed on a surface of the developing roll on conditions that a ratio of a groove depth to a groove width is set to one or more and a ratio of a groove pitch to a groove width is set to two or more and a groove depth is set to three times or more a carrier particle size, and a magnetic pole of the inside of the developing roll is provided in a position of a doctor blade for regulating the amount of carriage of a developer roll, and further a magnetic force on the surface of the developing roll of the position of the doctor blade is set to 0.06 T or less.

3 Claims, 5 Drawing Sheets

DEVELOPING ROLL, DEVELOPING DEVICE USING THE SAME AND ELECTROPHOTOGRAPHIC APPARATUS

BACKGROUND OF THE INVENTION

1. Field of the Invention

The present invention relates to an electrophotographic apparatus using a two-component developer in which toner and a carrier which is magnetic particles are mixed, and a developing device and a developing roll used therein.

2. Description of the Related Art

In an electrophotographic apparatus, a photoconductor is charged and exposure according to image data is performed and an electric charge distribution corresponding to an image pattern is formed on the photoconductor and an image appears as a visible toner image first by developing toner according to the electric charge distribution using a developing device. Thereafter, the toner image is transferred to paper and is fixed on the paper by thermal fixing and is completed as the image. In this development, there is a development method using two-component developer in which toner which is coloring particles of a resin powder with a particle size of the order of 10 $\mu$m and a carrier which is magnetic particles such as ferrite, magnetite or an iron powder with a particle size of 50 to 150 $\mu$m are mixed.

Also, in the developing device, a magnet is provided in the inside and a developer is carried in a development part which is a gap between the photoconductor and a developing roll by the developing roll whose external cylinder rotates. In this case, a regulating member for uniforming the amount of carriage of the developer in a length direction of the developing roll is provided within the developing device. The regulating member is referred to as a doctor blade and a distance between the doctor blade and the developing roll is referred to as a doctor gap. Also, a distance between the photoconductor and the developing roll is referred to as a development gap.

By the way, images formed by an electrophotographic method include a character, a line drawing, a dot or solid matter. With respect to all of these images, it is necessary to develop a proper amount of toner by the developing device so as to become an image with a recognizable density.

However, the actual development has characteristics in that the amount of development of toner becomes small in the inside of a solid image and the amount of development becomes large in the circumference portion of the solid image or portions close to the boundary with white fields of the line drawing or the dot. This is because a development electric field becomes strong in the boundary portions with the white fields by a peripheral effect. Here, the development electric field means an electric field of a direction perpendicular to a surface of the photoconductor determined by an electric charge distribution of the photoconductor surface or a development bias voltage applied to the developing roll, a film thickness and a dielectric constant of the photoconductor, a development gap and a dielectric constant of the developer, and toner particles charged by this electric field are attracted or repulsed and thus the development is performed.

This peripheral effect becomes a cause and in the case of setting development conditions (for example, a development bias voltage, a toner density, a peripheral velocity ratio) in which the amount of development of toner as the solid image becomes a proper density is obtained, the amount of adhesion becomes excessive in the line drawing or the dot and a scattering at the time of transfer becomes large, or a distortion of an image due to melting of toner at the time of fixing occurs.

For this reason, the circumference of the image or the line drawing becomes obscure, or a photographic image formed of dots becomes unclear due to a distortion or becomes a solid image even though a dark portion of the image is not perfectly solid in the extreme case.

Since the problems described above are due to the peripheral effect of the development electric field, it is possible to avoid the problems in principle by setting development conditions so that the peripheral effect is eliminated.

One of the avoidance means is means for narrowing a development gap described in JP-A-56-161565.

This conventional example relates to a technique for avoiding a problem that the circumference of an image is edged with another color when a two-color image is formed, and a cause of the problem is similar to the peripheral effect of the development electric field becoming the problem in the present application.

The reason why this peripheral effect can be reduced by narrowing the development gap is because a developing roll which is an actual electrode approaches a photoconductor and thereby an electric field between the photoconductor and the developing roll is determined by a development gap which is a gap between them and a development potential difference between a development bias voltage and a photoconductor potential. This phenomenon is shown in FIGS. 3A and 3B. This was found from a result of calculating an electric field strength distribution of a photoconductor surface in the case of keeping an electric charge distribution on the photoconductor constant and changing the development gap that an electric field strength of the solid inside increases by narrowing the development gap and approaches an electric field strength of the solid circumference or the line drawing as shown in FIG. 3B. Also, it could be recognized from the fact that when the development gap is actually narrowed, the amount of toner development of the solid inside increases and an image density becomes high.

By the way, in the conventional example, the amount of carriage of a developer is secured by providing projections and depressions on a surface of the developing roll and the peripheral effect is controlled by narrowing the development gap in the projections of the surface.

On the other hand, as a problem to which attention must be paid in the case of narrowing the development gap, when the development gap is narrowed, a volume density of the developer between the photoconductor and the developing roll becomes high and a pressure to the developer or a force rubbing the photoconductor increases. When this force becomes excessive, the developer starts to harden or the photoconductor is damaged. Actually, toner is resin and hardens when pressed by an excessive force, so that the toner performs a function like an adhesive as the developer and hardening of the developer including a carrier is caused and this is referred to as a developer lock. Further, this hardening becomes a cause and the photoconductor may be damaged.

As a result of that, in the case of narrowing the development gap, it is constructed so that a doctor gap is also narrowed at once and a volume density of the developer does not become too high between the photoconductor and the developing roll. Actually, the proportion of the volume including the toner and the carrier must be set to less than or equal to 50% the volume of space between the photoconductor and the developing roll.

However, in the case of using the developing roll of the conventional example or conventional developing rolls other than the developing roll, it is necessary to set the doctor gap narrower than the development gap, and in order to reduce the excessive development of the solid image circumference, the line drawing, the dot,due to the peripheral effect becoming the problem in the present application, a need to narrow the doctor gap further arose when the development gap attempts to be shortened further.

But, when the doctor gap; is narrowed, it proved that the amount of the developer passed from a doctor blade becomes non-uniform in a length direction of the developing roll. This results from variations in a flexure of the doctor blade or a surface shape of the developing roll and it is considered that the non-uniformity occurs because their variations become large relatively by narrowing the doctor gap. Therefore, in a method necessary to narrow the doctor gap more than the development gap in this conventional example or other conventional art, it is difficult to solve the problem to be solved in the present application still.

SUMMARY OF THE INVENTION

The invention has been made to solve such a problem that the amount of carriage of a developer does not become uniform in a length direction of a developing roll when the amount of carriage of the developer on the developing roll is decreased as described above, and a narrow development gap is implemented by solving this problem, and therefore an object of the invention is to provide an electrophotographic apparatus capable of reducing an excessive amount of toner adhesion to an image area of a solid image circumference, a line drawing or a dot due to a peripheral effect and obtaining a sharp image without distortions.

In order to solve the problem, grooves of a length direction of a developing roll are formed on a surface of the developing roll and a magnetic pole of the inside of the developing roll is provided in a position of a doctor blade for regulating the amount of carriage of a developer roll and further a magnetic force on the surface of the developing roll of the position of the doctor blade is set to 0.06 T or less.

Further, a ratio of a groove depth to a groove width is set to one or more, and a ratio of a groove pitch to a groove width is set to two or more, and a groove depth is set to three times or more a carrier particle size.

DETAILED DESCRIPTION OF THE PREFERRED EMBODIMENTS

The invention will be described below with reference to the accompanying drawings.

First, an image formation process of an electrophotographic apparatus will be described with reference to FIG. 2.

Figure 2:
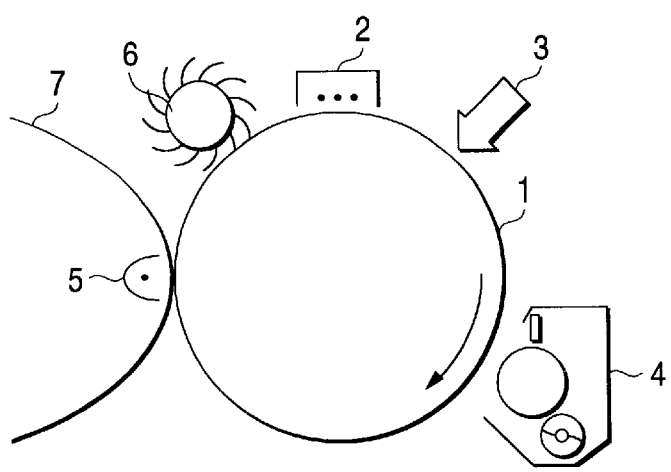
FIG. 2 is a schematic diagram showing a configuration of an electrophotographic apparatus.

In FIG. 2, the surface of a photoconductor 1 which rotates in a clockwise direction is uniformly charged by a charger 2 and in an exposure device 3, light blinks according to image data and on the photoconductor 1, a portion to which light is emitted becomes conductive and electric charges on the surface disappear.

Figure 1:
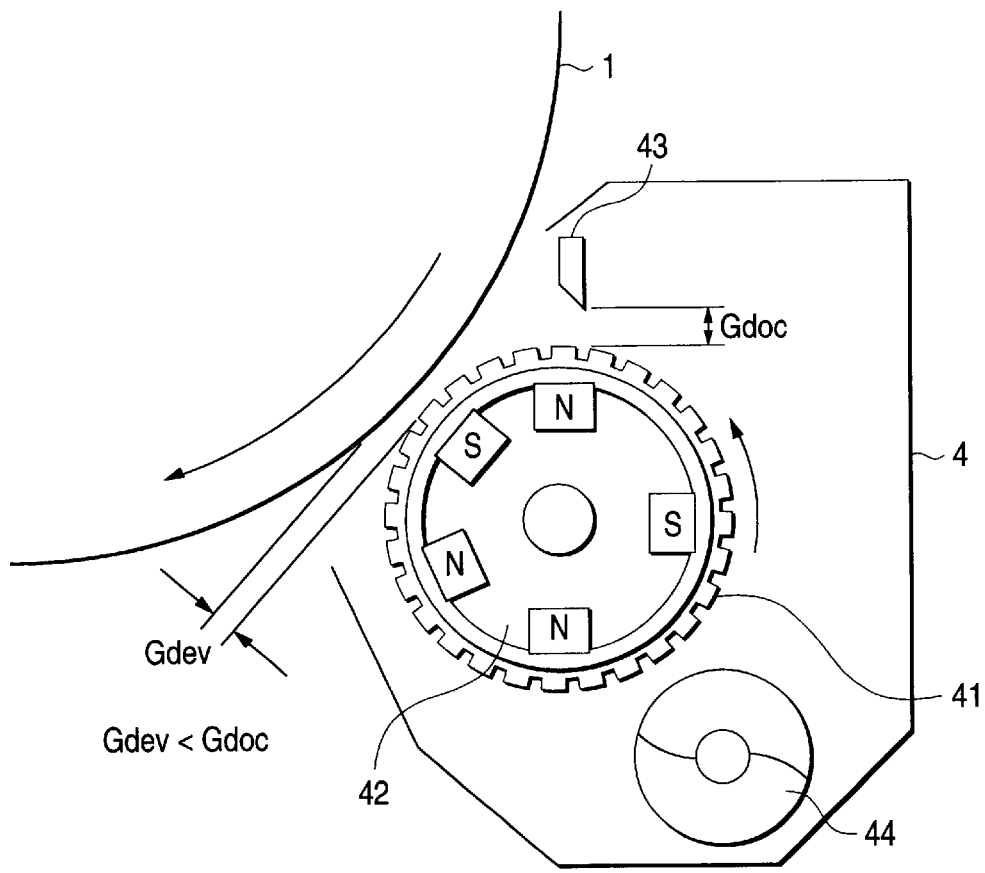
FIG. 1 is a schematic diagram of a developing device of the invention.

A developing device 4 has an internal configuration as shown in FIG. 1, and a two-component developer in which toner and a carrier are mixed is included, and the toner produces friction to the carrier to bear electric charges by rotation of an agitator 44. A developing roll 41 has a non-rotational magnet roll in the inside, and the developer is adsorbed to a sleeve of the surface by a magnetic force and is carried with rotation of the sleeve. The carried developer is regulated so that when passing a doctor blade 43, the passing amount becomes uniform in a length direction of the developing roll 41 by a doctor gap Gdoc which is a gap between the doctor blade 43 and the developing roll 41. The developer passing the doctor blade 43 is carried to a development area which is a gap area between the photoconductor 1 and the developing roll 41, and the toner of the amount according to an electric field strength determined by a bias voltage applied to the developing roll 41 and a photoconductor surface potential, a development gap Gdev which is a gap between the photoconductor 1 and the developing roll 41 though they are not shown in the drawing here is developed on a surface of the photoconductor 1.

A toner image is formed on the photoconductor 1 by the development and is transferred on paper 7 by a transfer device 5. The toner image transferred on the paper 7 is melted by heating of a fixing device and is fixed on the paper 7 (not shown). Thereafter, the toner remaining on the photoconductor 1 is removed by a cleaner 6 and subsequently in like manner, images are formed.

Figure 3A:
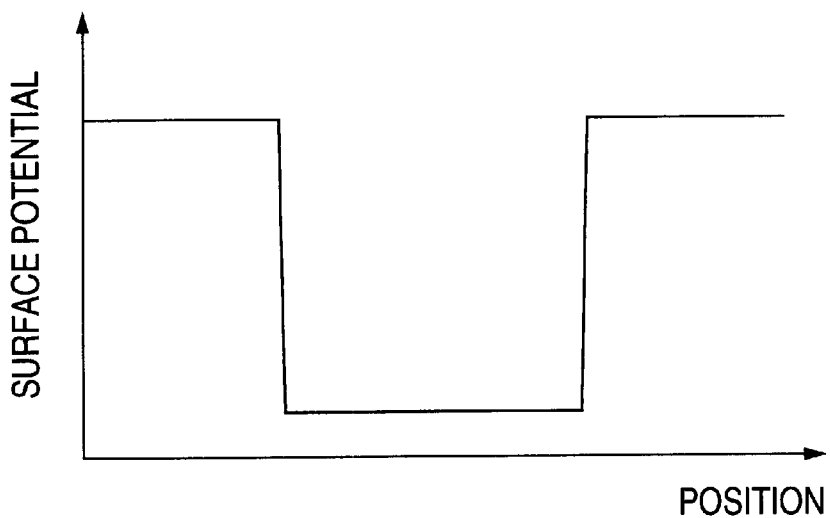
FIGS. 3A and 3B are graphs of a surface potential distribution and a development electric field distribution, respectively.
Figure 3B:
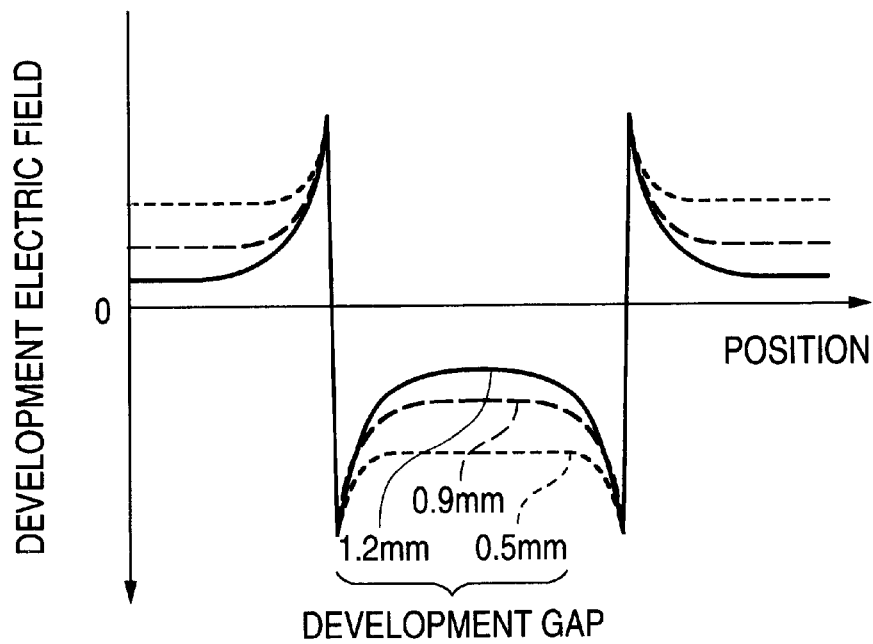

A surface potential of the photoconductor is formed, for example, as shown in FIG. 3A, and a method in which toner is developed in a portion of low potential is referred to as reversal development and a method in which toner is developed in a portion of high potential is referred to as normal development. Here, the case of the reversal development will be described. FIG. 3B showed a calculation result of a development electric field. The calculation was performed in consideration of a photoconductor surface potential distribution, a photoconductor film thickness, a dielectric constant, a dielectric constant of developer space or a development gap. A calculation method itself has already been established. A development electric field means the rate of change in distance of a potential of the perpendicular direction on the photoconductor surface. As this development electric field increases, a force for attracting the toner to the photoconductor becomes stronger. The electric field in which the toner downward from zero of the axis of ordinate is developed is shown in FIG. 3B. Also, FIG. 3A shows a potential distribution of images with a wide area like a solid image. In the development electric field of their images, as shown in FIG. 3B, the development electric field of the circumference of the solid image becomes strong and the electric field strength becomes larger downwardly in the drawing, but the development electric field of the inside of the solid image becomes weak. The fact that the development electric field of the circumference of this solid image becomes strong is referred to as a peripheral effect. This peripherals effect is remarkable also in a line drawing and this is not shown in FIGS. 3A and 3B, but in a line drawing with a width of the order of 0.1 mm to 1 mm, a calculation result of becoming a development electric field with a strength more than or equal to that of the circumference of FIGS. 3A and 3B has been obtained. Since there is this peripheral effect, when the amount of toner developed by conditions such as a development bias, a peripheral velocity ratio or a toner density is adjusted so that an image density of the inside of the solid image becomes proper, for example, an optical density of 1.4, the excessive toner is developed in the solid image circumference or the line drawing and as described above, a distortion of the image occurs. This is because the conditions such as a development bias, a peripheral velocity ratio or a toner density also have a function of increasing the amount of development toner of a line drawing or a dot.

By the way, FIG. 3B also shows the case of narrowing a development gap. As the development gap is narrowed from 1.2 mm to 0.5 mm through 0.9 mm, a result that an electric field strength of the inside of the solid image increases and an electric field strength of the circumference does not very change was obtained. Actually, by narrowing the development gap, a result that an increase in the amount of toner development of the solid image is more remarkable than that of the line drawing was obtained. Therefore, by narrowing the development gap, the amount of adhesion of the solid image can be more increased without very increasing the amount of toner development of the line drawing to reduce a difference between the solid image and the line drawing in the amount of toner development.

By narrowing this development gap to increase the amount of toner development of the solid image, the proportion of increasing the amount of development toner by the development bias, the peripheral velocity ratio or the toner density decreases, and when the amount of development toner of an solid image area capable of obtaining the same solid image density as the conventional art consequently is obtained, the amount of development toner of the line drawing or the dot can be reduced, and excessive development such as a distortion in which the image becomes unclear can be avoided.

Figure 4:
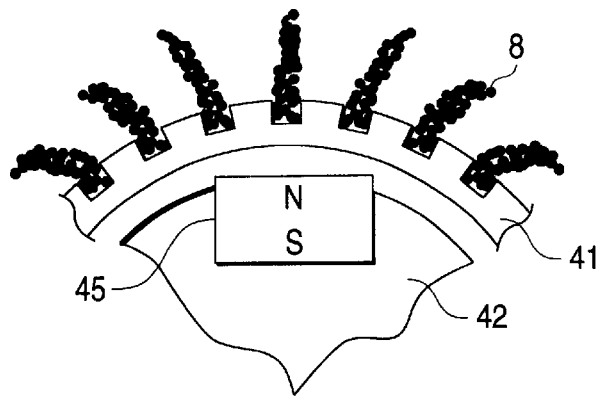
FIG. 4 is a schematic diagram showing a state of a magnetic brush.

In order to narrow this development gap, in the conventional method as described above, it is also necessary to narrow the doctor gap, and the description of generating non-uniformity in the amount of carriage of the developer in a length direction of the developing roll by this narrowed doctor gap was made. In the invention, without narrowing the doctor gap, the amount of passage of the developer can be reduced to narrow the development gap. The principle will be described with reference FIGS. 4 and 5. FIG. 4 is a diagram showing a form of a magnetic brush in the case of providing rectangular grooves on a surface of the developing roll 41. It was checked that the magnetic brush 8 was selectively formed in groove portions of the surface of the developing roll 41.

Figure 5:
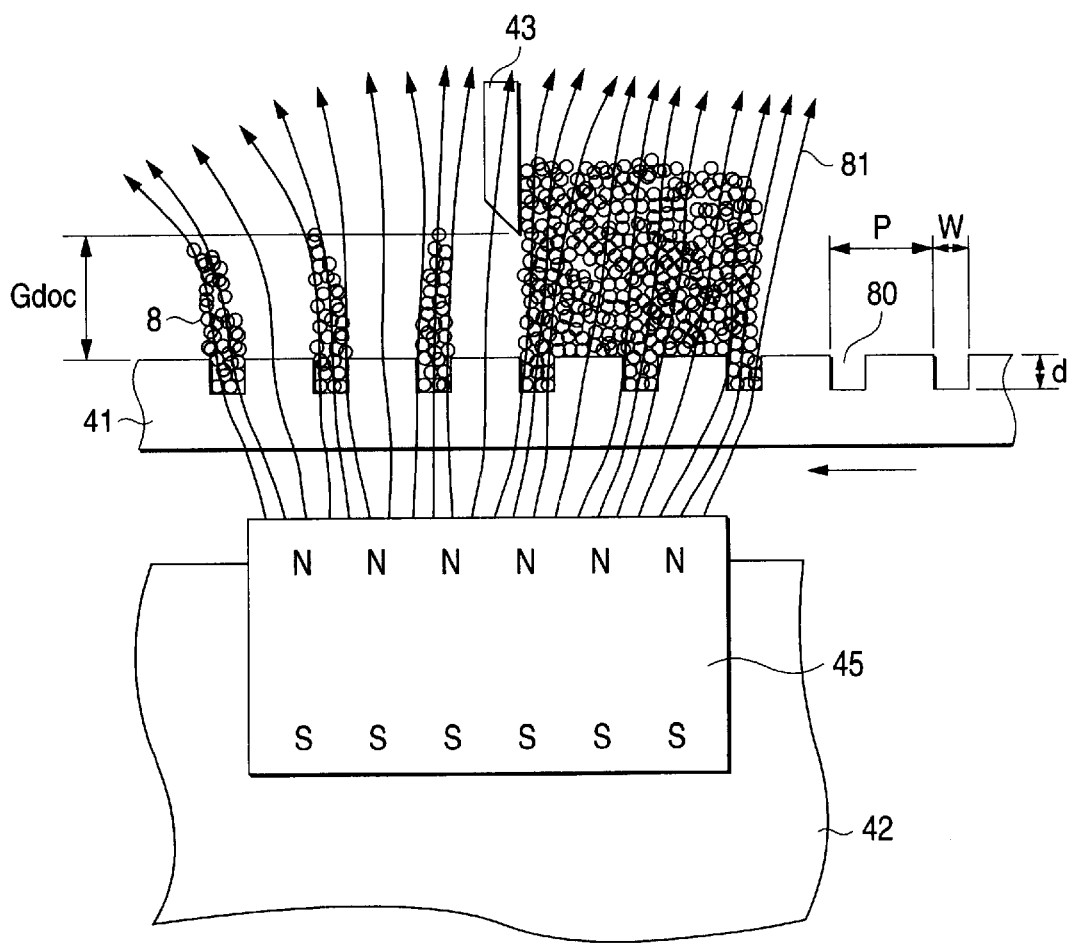
FIG. 5 is a diagram illustrating a principle of the invention.

The principle in which, the magnetic brush 8 is formed thus will be described with reference to FIG. 5. FIG. 5 is an enlarged view of a doctor blade portion. For description, a developing roll has a cylindrical shape but is indicated as a flat plate. A magnet roll 42 is present in the inside of the developing roll 41, and a magnetic pole 45 is formed in the magnet roll. Incidentally, there is a case of forming this magnetic pole by sticking magnets or a case of forming this magnetic pole by magnetizing the magnet roll 42 using the magnet roll 42 as a magnetic material and here, for convenience in illustrating the magnetic pole, a drawing formed by the magnets is shown.

A magnetic flux 81 issues from this magnetic pole 45. Since the developing roll 41 moves from right to left in the drawing, a developer is dammed in the front of the doctor blade 43 and the pressure rises and a part of the developer enters the inside of grooves 80 having a depth d. Since a carrier in the developer is a magnetic material, there are properties in which the magnetic flux tends to be passed. On the other hand, aluminum or non-magnetic stainless steel is used in a material of the developing roll 41. Then, the magnetic flux 81 concentrates on the carrier entering the grooves 80 from the magnetic pole 45. This becomes a cause of further attracting the next carrier and in the developer after passing the doctor blade 43, the magnetic brush is formed in portions of the grooves. Further, in the case of passing the doctor blade 43, a magnetic flux density becomes low in portions other than the grooves 80 and a magnetic force of attracting the carrier is weak, so that the carrier slips and characteristics that only the magnetic brush formed in the portions of the grooves 80 selectively passes the doctor blade 43 appear. Therefore, even when the doctor gap Gdoc is widely set, the developer passing the doctor blade 43 can be reduced to a ratio of a groove width W to a groove pitch P ideally compared with the conventional method.

By the action as described above, even when the doctor gap is widely set, the amount of developer passing the doctor blade can be reduced and even when the development gap is narrowed, a developer density does not become high excessively in a development area and a developer lock is not caused. Also, in the case of making a setting to the minimum doctor gap in which non-uniformity of the amount of carriage of the developer is not caused in a length direction of the developing roll in the conventional adjustment method, the development gap can be set narrower than that of the conventional method.

Figure 6:
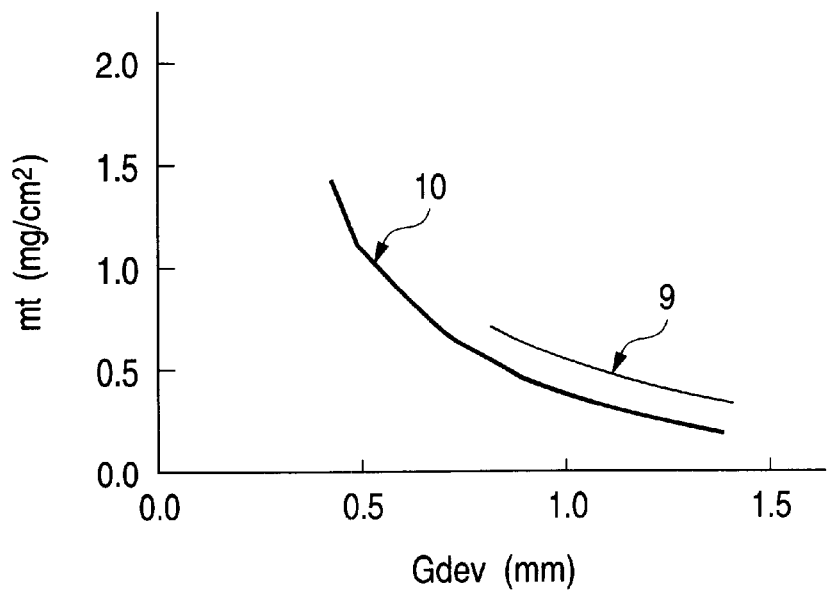
FIG. 6 is a graph showing development gap characteristics of the amount of toner adhesion.

FIG. 6 is a result of checking a relation between the development gap and the amount of toner development to a solid image area. The amount mt of toner development is a weight of toner developed per unit area.

In FIG. 6, a curve shown by numeral 9 was an experimental result in the conventional method and a limit of a doctor gap in which non-uniformity of the amount of carriage of the developer is not caused in a length direction of the developing roll was 0.5 mm and a development gap was 0.8 mm. On the other hand, a curve shown by numeral 10 was an experimental result to which the invention is applied, and in the case that a groove width is 0.5 mm and a groove depth is 0.5 mm and a groove pitch is 1.7 mm, the amount of passage of the developer from the doctor blade could actually be reduced to ½ that of the conventional method though the amount of passage should be reduced to ⅓ because the amount of passage ideally decreases at a ratio of a groove width W to a groove pitch P. Therefore, the development gap could be narrowed to ½ (0.4 mm) that of the conventional method.

From FIG. 6, the amount of carriage of the developer becomes small in the same development gap, so that the amount of toner developed becomes small. However, in the case of an image with a wide area, it approximately becomes a value obtained by dividing a surface potential of the photoconductor and a development bias voltage by the development gap, so that a development electric field becomes strong as the development gap becomes narrow and there are characteristics that the amount of development toner increases suddenly. Therefore, in spite of a decrease in the amount of carriage, by an effect capable of further narrowing the development gap, the amount of development toner of the solid image could be increased more than that of the conventional method. As a result, in a ratio of the amount of development toner with respect to a line drawing, a difference between the line drawing and the solid image in the amount of adhesion was about three times in the case of a development gap of 1.2 mm, but the difference could be reduced to about 1.5 times in the case of a development gap of 0.4 mm.

By the action as described above, a narrow development gap is implemented, and an excessive amount of toner adhesion to an image area of the solid image circumference, the line drawing or the dot due to the peripheral effect could be reduced to obtain a sharp image without distortions.

Next, conditions for surely taking an effect of the invention further will be described.

Figure 7A:
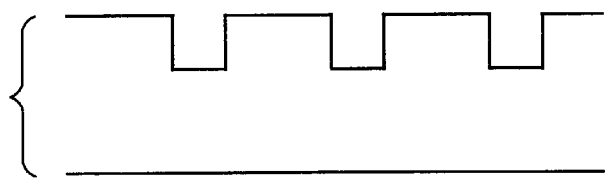
FIGS. 7A, 7B and 7C are,schematic diagrams of groove shapes.
Figure 7B:
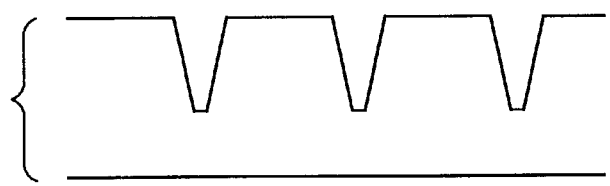
Figure 7C:
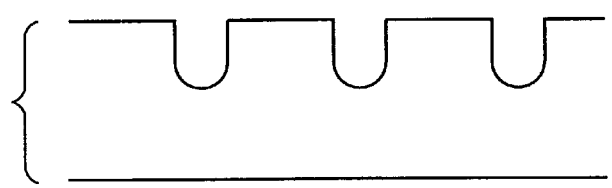

First, a shape of grooves will be described with reference to FIGS. 7A to 7C. FIG. 7A shows the same rectangular grooves as FIGS. 4 and 5, and even when the rectangular grooves are shallow in depth, the amount of the developer capable of being held in the inside of the grooves can be maximized, so that the rectangular grooves are a shape in which a magnetic flux from a magnetic pole tends to be concentrated most. A depth and a width of the grooves need to be determined by the degree of concentration of this magnetic flux, and in order to form a magnetic brush selectively in the groove portions, the groove depth of 0.2 mm or more (desirably, 0.3 mm or more) was good in this shape of the rectangular grooves. This is a depth necessary to secure the amount of the carrier held in the inside of the grooves for triggering the concentration of the magnetic flux. As a carrier, a magnetite carrier with the average particle size of 100 μm was used, and it was found that a depth of 0.2 mm or more is required since the carrier is not held surely in the groove unless the groove has a depth of two carriers at the minimum.

Also, as the groove depth becomes deep with respect to the groove width, the concentration of the magnetic flux tends to be triggered, but the groove cannot be deepened too much in consideration of the fact that a cylinder thickness of the developing roll is generally 1 to 2 mm. However, it proved that the depth more than or equal to the groove width is advantageous for the concentration of the magnetic flux. Therefore, it is desirable that a ratio of the groove depth to the groove width be one or more.

A groove pitch needs to be also determined by the decreasing proportion of the developer passing the doctor blade, and it proved that it is necessary to provide the same distance as a groove width between the grooves in order to form a magnetic brush in only the groove portions by the developer passed from the doctor blade. Since the magnetic brush standing from the groove portions on the developing roll tends to widen somewhat than the groove width, a phenomenon that the magnetic brush between the adjacent grooves links occurs when the distance between the grooves is narrow. When this phenomenon occurs, the amount of the developer passing the doctor blade cannot be reduced. Therefore, it is desirable that a ratio of the groove pitch to the groove width be two or more.

As described above, it is necessary to determine a width, a depth and a pitch of the grooves, and as a result of further examining a relation with a shape of the grooves, it proved that it is good if the amount of the carrier held in the grooves and a cycle of the distribution are equivalent to the rectangular grooves of FIG. 7A. This is because it is good if the amount of the carrier held in the grooves and a center of the distribution become equal to the rectangular grooves of FIG. 7A even in the case of V-shaped grooves as shown in FIG. 7B or U-shaped grooves as shown in FIG. 7C. This is considered because a cause of forming the magnetic brush in only the groove portions is concerned with the amount of carriers for concentrating the magnetic flux from the magnetic pole and the degree of concentration of a distribution in a width wise direction.

Figure 8:
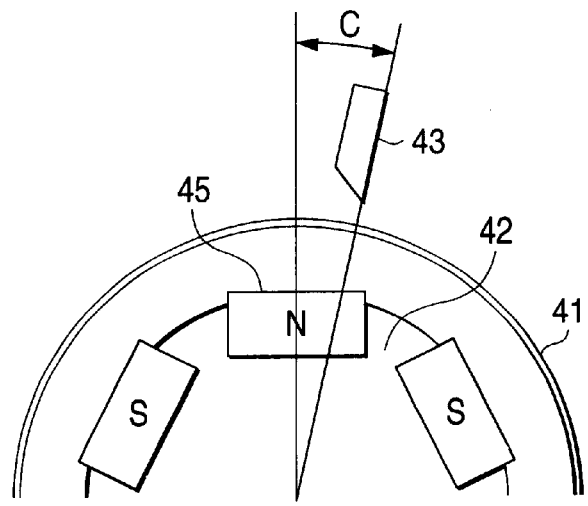
FIG. 8 is a schematic diagram showing a position relation between a doctor blade and a magnetic pole.
Figure 9:
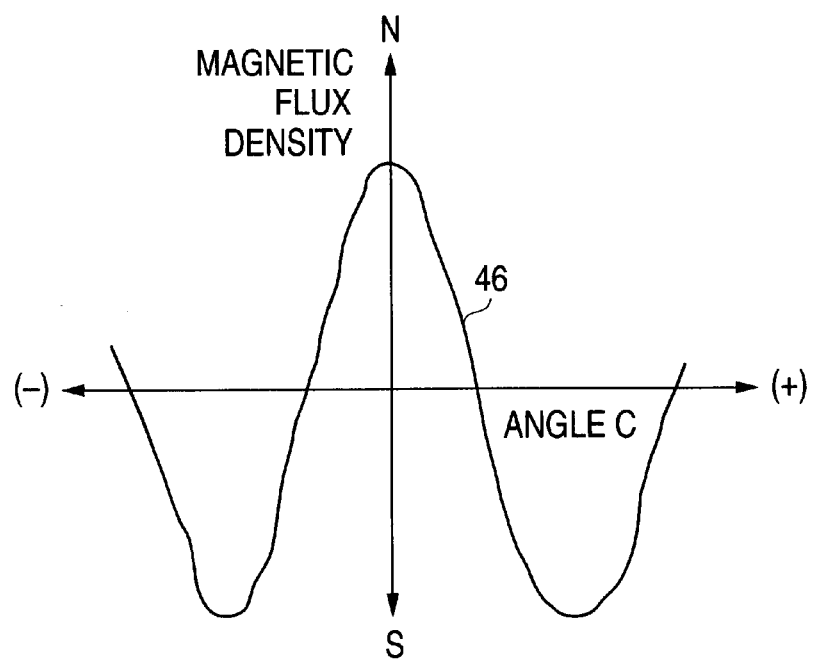
FIG. 9 is a graph of a magnetic flux density distribution perpendicular to a surface of a developing roll.

Next, a relation between the doctor blade and a magnetic pole of the inside of the developing roll 41 will be described. FIG. 8 shows a positional relation (angle C) between the doctor blade 43 and the magnetic pole 45, and FIG. 9 shows a curve 46 representing an angle C from the center of the magnetic pole versus a magnetic flux density distribution perpendicular to a surface of the developing roll. In order to reduce the amount of passage of the developer from the doctor blade 43 at a ratio of a groove width to a groove pitch, it was proved that a position of the doctor blade should be set from the center of the magnetic pole within the range in which a magnetic flux density becomes 70% or more that of the center of the magnetic pole. Without this range, a magnetic flux density perpendicular to the developing roll surface is low but a magnetic flux density parallel to the developing roll surface becomes high, and the magnetic brush shown in FIG. 5 becomes slant and passes the doctor blade, so that the amount of passage of the developer cannot be reduced.

Also, with a magnetic flux density of the magnetic pole, when the magnetic flux density is high, a magnetic flux cannot be concentrated sufficiently in the groove portions and the magnetic flux in portions other than the grooves remains, and it also proved that the amount of passage from the doctor blade cannot be reduced. It proved that it is preferable that the magnetic flux density of the magnetic pole be 0.06 T or less, desirably 0.04 T or less.

By setting a groove width of 0.5 mm, a groove depth of 0.5 mm, a groove pitch of 1.7 mm, a doctor blade position of the magnetic pole center, a magnetic flux density of the magnetic pole center of 0.04 T, a doctor gap of 0.5 mm as the conditions as described above, the amount of passage of the developer from the doctor blade could further be reduced to ½ the conventional limit value.

A narrow development gap can be narrowed while uniforming the amount of carriage of a developer in a length direction of a developing roll, and a variation in a density of the length direction of the developing roll is not caused, and an excessive amount of toner adhesion to an image area of a solid image circumference, a line drawing or a dot due to a peripheral effect can be reduced to obtain a sharp image without distortions.

What is claimed is:

1. A developing roll that carries a two-component developer containing toner and a carrier, comprising:

a plurality of magnetic poles disposed inside said developing roll, wherein grooves are formed on a surface of said developing roll along a lengthwise direction of said developing roll so that a ratio of a groove depth to a groove width is more than 1, a ratio of a groove pitch to the groove width is 2 or more, and the groove depth is three times or more of a carrier particle size, and wherein a development gap is 0.4 to 0.8 mm.

2. A developing device comprising:

a developing roll that carries a two-component developer containing toner and a carrier, said developing roll comprising a plurality of magnetic poles disposed inside said developing roll, and wherein grooves are formed on a surface of said developing roll along a lengthwise direction of said developing roll so that a ratio of a groove depth to a groove width is more than 1, a ratio of a groove pitch to the groove width is 2 or more, and the groove depth is three times or more of a carrier particle size; and a doctor blade disposed opposite to one of said magnetic poles for regulating the amount of two-component developer carried by said developing roll, wherein a magnetic force on the developing roll surface of said developing roll that is opposite to said doctor blade is set to 0.06 T or less, and wherein a development gap is 0.4 to 0.8 mm.

3. An electrophotographic apparatus that forms a toner image on a photosensitive body, said electrophotographic apparatus comprising:

a developing roll that carries a two-component developer containing toner and a carrier, said developing roll comprising a plurality of magnetic poles disposed inside said developing roll, and wherein grooves are formed on a surface of said developing roll along a lengthwise direction of said developing roll so that a ratio of a groove depth to a groove width is more than 1, a ratio of a groove pitch to the groove width is 2 or more, and the groove depth is three times or more of a carrier particle size; and wherein a magnetic force on the developing roll surface of said developing roll that is opposite to a doctor blade is set to 0.06 T or less, and wherein a development gap is 0.4 to 0.8 mm.

* * * * *